US008743761B2

(12) United States Patent
Ma et al.

(10) Patent No.: US 8,743,761 B2
(45) Date of Patent: Jun. 3, 2014

(54) IMPLEMENT METHOD FOR POWER CONTROL OF THE HIGH SPEED SHARED CONTROL CHANNEL AND THE HIGH SPEED SHARED INFORMATION CHANNEL

(75) Inventors: Zijiang Ma, Shenzhen (CN); Zhifeng Ma, Shenzhen (CN); Yincheng Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1374 days.

(21) Appl. No.: 12/092,005

(22) PCT Filed: Nov. 1, 2006

(86) PCT No.: PCT/CN2006/002929
§ 371 (c)(1),
(2), (4) Date: Apr. 29, 2008

(87) PCT Pub. No.: WO2007/051412
PCT Pub. Date: May 10, 2007

(65) Prior Publication Data
US 2008/0285522 A1 Nov. 20, 2008

(30) Foreign Application Priority Data

Nov. 2, 2005 (CN) .......................... 2005 1 0117337

(51) Int. Cl.
*G08C 17/00* (2006.01)
*H04B 7/216* (2006.01)
*H04W 52/20* (2009.01)
*H04W 52/14* (2009.01)
*H04W 52/28* (2009.01)

(52) U.S. Cl.
CPC ............ *H04W 52/20* (2013.01); *H04W 52/143* (2013.01); *H04W 52/286* (2013.01)
USPC ......................................... 370/311; 370/342

(58) Field of Classification Search
None
See application file for complete search history.

(56) References Cited

U.S. PATENT DOCUMENTS 7,664,521 B2 * 2/2010 Arimitsu ...................... 455/522
(Continued)

FOREIGN PATENT DOCUMENTS

| CN | 1479541 A | 3/2003 |
| CN | 1430430 A | 7/2003 |
| CN | 1449204 A | 10/2003 |

OTHER PUBLICATIONS

Technical Specification "3rd Generation Partnership Project; Technical Specification Group Radio Access Network; Physical layer procedures (TDD) (Release 6);" 3GPP TS 25.224 V6.5.0 (Jun. 2005).

(Continued)

*Primary Examiner* — Christine Duong
(74) *Attorney, Agent, or Firm* — Banner & Witcoff, Ltd.

(57) ABSTRACT

The present invention discloses a method for implementing power control of the high speed shared control channel and the high speed shared information channel, including: Node B independently setting the initial transmit power of the HS-SCCH with reference to the maximum power of HS-SCCH configured by higher layer and completing the open-loop power control; performing the close-loop power control based on transmit power control TPC command; UE calculating the initial transmit power based on a series of parameters configured by the higher layer and completing the open-loop power control; UE adjusting the close-loop transmit power based on the TPC command carried on HS-SCCH and completing the close-loop power control. Wherein, Node B generates the TPC by taking the high speed shared information channel SNR generated by itself as the target value and the high speed shared information channel SNR measured as the actual value. The present invention can achieve the power control of HS-SCCH and HS-SICH based on the TPC parameters for HS-SICH close-loop control calculated by Node B.

1 Claim, 2 Drawing Sheets

(56) References Cited

U.S. PATENT DOCUMENTS

| | | |
|---|---|---|
| 2005/0143121 A1 | 6/2005 | Huh et al. |
| 2006/0093026 A1* | 5/2006 | Montojo et al. ............... 375/225 |
| 2007/0217348 A1* | 9/2007 | Tapia Moreno et al. ...... 370/278 |
| 2008/0025246 A1* | 1/2008 | Anderson et al. ............. 370/318 |
| 2010/0135220 A1* | 6/2010 | Bergstrom et al. ........... 370/329 |

OTHER PUBLICATIONS

Agenda Item 7.8, Document for Discussion at 3GPP TSG-RAN WG1#26, entitled "HS-SICH-Specific SIR target for 3.84Mcps TDD;" Jul. 2-5, 2002.

Technical Specification 3rd Generation Partnership Project; "3GPP TS 25.331 V6.7.0" (Sep. 2005).

* cited by examiner

IMPLEMENT METHOD FOR POWER CONTROL OF THE HIGH SPEED SHARED CONTROL CHANNEL AND THE HIGH SPEED SHARED INFORMATION CHANNEL

This application is a national stage application of PCT application PCT/CN2006/002929 filed Nov. 1, 2006, which was published in Chinese under PCT Article 21(2) on Oct. 5, 2007, which claims the benefit of CN patent application application no. 200510117337.1 filed Feb. 11, 2005, which are incorporated by reference herein in their entireties.

TECHNICAL FIELD OF THE INVENTION

The present invention relates to mobile communication field, more specifically, to a method for implementing power control of high speed shared control channel (HS-SCCH) and high speed shared information channel (HS-SICH) in Time Division Code Division Multi Access (TD-CDMA) system.

TECHNICAL BACKGROUND OF THE INVENTION

High Speed Downlink Packet Access (HSDPA) is a technology which offers high speed downlink data service for multi-users and is suitable for the services with a lot of downloaded information, such as multimedia, Internet etc. HSDPA introduces a new transmission channel, i.e. High Speed Downlink Shared Channel (HS-DSCH), in which, time division multiplexing is used for the users to share the downlink code resources and power resources. This structure is adapted for burst packet data service. Downlink physics channel HS-SCCH (High Speed Shared Control Channel) is used to carry the physical layer control signaling for decoding in HS-DSCH. By reading out the information in HS-SCCH, user equipment (UE) can find HS-DSCH resources configured for the UE according to the physical layer information such as the assigned code channel, timeslot and modulation mode, meanwhile, UE feeds back the channel quality indicator (CQI) and data block decoding information (Ack/Nack) of the HS-DSCH by sending HS-SICH (High Speed Shared Information Channel) to Node B.

According to 3GPP (3$^{rd}$ Generation Partnership Project) protocol, the HS-SCCH and the HS-SICH that Node B assigns to the UE always appear in pair. Node B may assign 1 to 4 HS-SCCH physical channels to the UE, correspondingly, it also assigns 1 to 4 HS-SICH physical channels to the UE. All the HS-SCCHs assigned for one UE are called as a HS-SCCH set, and correspondingly, there is a HS-SICH set. The UE can use only one HS-SCCH in the set and one corresponding HS-SICH at a time point of TTI (Transmit Time Interval).

TDD system includes HCR TDD and LCR TDD. HCR TDD is a TDD that has high chip rate, the chip rate is 3.84 Mcps; LCR TDD is a TDD that has low chip rate, and the chip rate is 1.28 Mcps, which is TD-SCDMA (Time Division Code Division Multiple Access). In these two types of TDD systems, both the HS-SICH that Node B sends to UE and the corresponding HS-SCCH that Node B sends to UE need power control. Both the power control of HS-SICH performed by UE and the power control of HS-SCCH performed by Node B include open-loop power control and close-loop power control.

In these two types of TDD systems, the processes of HS-SICH close-loop power control are the same, yet the parameters configured are different; the calculation methods of HS-SICH open-loop power control are different; the processes of HS-SCCH open-loop and close-loop power control are the same, both are implemented by Node B independently.

The open-loop power control is used in the process that the UE initially sends the power value of HS-SICH and the process that Node B initially sends the power value of HS-SCCH; whereafter, when UE receives the subsequent HS-SCCH and Node B receives the subsequent HS-SICH fed back, the close-loop power control will be applied, and TPC (Transmit Power Control) parameters carried on the HS-SCCH and HS-SICH will be used to adjust the close-loop transmit power.

The initial HS-SICH transmit power calculated by the UE is used for open-loop power control. According to 3GPP protocol, the principles of the HS-SICH open-loop power control of the two types of TDD systems are the same, but their calculation formulae are different, which can be specified as follows:

in LCR-TDD system, the formula for UE calculating the initial HS-SICH transmit power is:

$$P_{HS\text{-}SICH}=PRX_{HS\text{-}SICH}+LPCCPCH$$

wherein, $P_{HS\text{-}SICH}$ is the transmit power (dBm);

$PRX_{HS\text{-}SICH}$ is the desired HS-SICH receiving power received by UE, which is notified by the higher layer to the UE through the information element "Downlink HS-PDSCH Information" in RRC protocol;

LPCCPCH is the compensation value of UE measurement, which the UE can get by reading out the information element "Primary CCPCH Tx Power" in system message block 5 or 6, or is notified by the higher layer to the UE through the information element "Uplink DPCH Power Control info" in RRC protocol.

In HCR TDD system, the formula for UE calculating the initial HS-SICH transmit power is:

$$P_{HS\text{-}SICH}=\alpha LPCCPCH+(1-\alpha)L_0+I_{BTS}+SIR_{TARGET}+ \\ HS\text{-}SICH \text{ Constant value}$$

wherein:

$L_0$ is the long-term average value of path loss;

$\alpha$ is the weighting parameter;

$I_{BTS}$ is the interference signal power at the base station receiver;

$SIR_{TARGET}$ is the target Signal Noise Ratio (dB), which is notified by the higher layer to the UE through the information element "HS-SICH Power Control Info" in RRC protocol;

HS-SICH Constant value is a value assigned by the higher layer through the information element "HS-SICH Constant value" in RRC protocol.

However, the method for implementing power control of HS-SCCH by Node B is not provided in 3GPP protocol, for example, 3GPP protocol does not specify how the Node B calculates and generates TPC used for adjusting the uplink HS-SICH close-loop power control, or the TPC parameter is carried on the HS-SCCH and sent to UE.

In addition, although 3GPP protocol offers the method for UE calculating the initial HS-SICH transmit power, yet some parameters are uniformly configured for the whole HS-SCCH set and the whole HS-SICH set, while some others are individually configured for each HS-SCCH and each HS-SICH in the HS-SCCH set and the HS-SICH set, causing the configuration of parameters related to power control to be inaccurate.

SUMMARY OF THE INVENTION

The technical problem to be solved by the present invention is to provide a method for Node B carrying transmit power control parameters on HS-SCCH, calculating and generating the TPC parameters used for adjusting the uplink HS-SICH close-loop power control, and further provide an method for implementing power control of HS-SCCH and HS-SICH, performing power control for the high speed shared control channel sent by Node B to the UE and the high speed shared information channel sent by the UE to Node B.

The present invention provides a method for Node B carrying the transmit power control parameters on HS-SCCH, which is used for the HSDPA technology in TD-CDMA system, including the following steps of:

generating HS-SICH signal noise ratio (SNR) target by Node B;

measuring the HS-SICH SNR received to obtain the actual measurement value by Node B; and calculating the transmit power control parameter by Node B according to said HS-SICH SNR target and the actual measurement value, and carrying the transmit power control parameter on HS-SCCH.

Wherein, said HS-SICH SNR target is generated according to the channel quality indicator fed back on HS-SICH, or data block decoding information, or modulation mode information of the high speed physical downlink shared channel, or their combination.

Wherein, the step of said Node B calculating the transmit power control parameter according to the target value and actual value of SNR includes:

when the actual value is larger than the target value, setting the transmit power control parameter as "DOWN";

when the actual value is less than the target value, setting the transmit power control parameter as "UP".

The present invention further provides a method for implementing power control of HS-SCCH, which is used in the HSDPA technology in TD-CDMA system, performing power control for the HS-SCCH sent by Node B to the UE, including the following steps of:

configuring the parameters related to the power control by the network side for Node B through higher layer signaling, including "maximum HS-SCCH power" parameter;

setting the initial HS-SCCH power by Node B according to said "Maximum HS-SCCH power" parameter, and the initial HS-SCCH power being used for open-loop power control;

adjusting the close-loop transmit power by Node B according to the "transmit power control" parameter carried on the channel.

Said method further includes:

calculating the "transmit power control" parameter by Node B according to the HS-SICH SNR target value independently generated and the HS-SICH SNR actual measurement value measured, and carrying the "transmit power control" parameter on HS-SCCH.

Wherein, said "Maximum HS-SCCH power" parameter is configured by the network side through the "Physical Shared Channel Re-configuration process" in the "Node B application part" protocol.

Wherein, the step of said Node B adjusting the close-loop transmit power according to the "transmit power control" parameter carried on the channel is performed based on the "transmit power control" parameter carried on HS-SICH.

Wherein, the step of said Node B adjusting the close-loop transmit power according to the "transmit power control" parameter carried on the channel is performed based on the "transmit power control" parameter carried on the dedicated physical channel.

Wherein, said HS-SICH SNR target is generated according to the CQI fed back on HS-SICH, or data block decoding information, or modulation mode information of the high speed physical downlink shared channel, or their combination. The step of said Node B calculating the "transmit power control" parameter according to the target value and actual value of SNR includes:

when the actual value is larger than the target value, setting the "transmit power control" parameter as "DOWN";

when the actual value is less than the target value, setting the "transmit power control" parameter as "UP".

The present invention also provides a method for implementing power control of HS-SICH, which is used in the HSDPA technology in TD-CDMA system, performing power control for the HS-SICH sent by the UE to Node B, including the following steps of:

configuring the parameters related to the power control for UE by the network side through higher layer signaling, said parameters including the parameters used to calculate the initial transmit power;

calculating the initial HS-SICH transmit power to be used for open-loop power control by the UE according to said parameters configured;

adjusting the close-loop power control of HS-SICH by the UE according to the "transmit power control" parameter carried on HS-SCCH.

Said method further includes the following steps of:

configuring the parameters related to the power control for the UE by the network side through higher layer signaling, said parameters including "HS-SCCH Block Error Ratio (BLER) target" parameter;

taking the "HS-SCCH BLER target" parameter configured by the higher layer as the target value by the UE;

measuring the received block error rate of HS-SCCH by the UE to obtain the actual value of "HS-SCCH block error rate";

calculating the "transmit power control" information by the UE according to said target value and said actual value, and carrying the information on HS-SICH.

Wherein, the step of said network side configuring the parameters related to the power control for the UE through higher layer signaling is to configure a set of parameters related to the power control for the whole HS-SICH set of the UE.

Wherein, the parameters related to the power control configured by said network side for the UE through the higher layer signaling are configured through the information element "HS-SCCH Information" in "Radio Resource Control" protocol.

By using the present invention, Node B can calculate the TPC (transmit power control) parameter used for adjusting the uplink HS-SICH close-loop control, and carry the TPC parameter on HS-SCCH to be sent to the UE, thereby realizing the power control for HS-SCCH and HS-SICH.

PREFERRED EMBODIMENTS OF THE INVENTION

Figure 1:
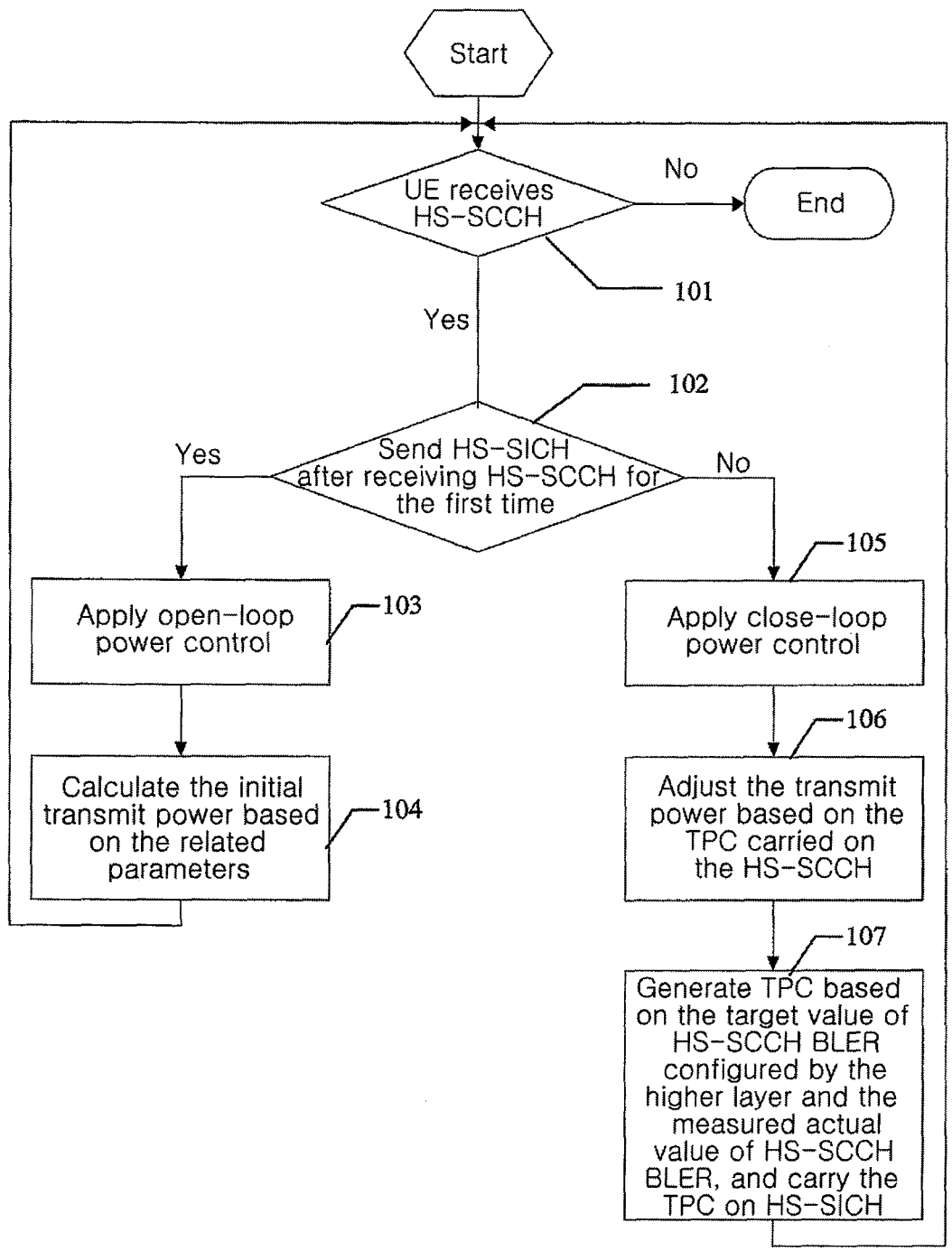
FIG. 1 is a flow chart of power control of UE sending HS-SICH in accordance with an embodiment of the present invention.

The power control process according to an embodiment of the present invention includes the power control of HS-SICH performed by the UE and the power control of HS-SCCH performed by Node B, and the power control process includes open-loop power control and close-loop power control.

The basic thought of the present invention is:

The UE calculates the initial transmit power according to a series of parameters configured by the higher layer, and completes the open-loop power control; the UE adjusts the close-loop transmit power according to the TPC (Transmit Power Control) command carried on HS-SCCH, and completes the close-loop power control.

With reference to the "HS-SCCH Maximum Power" configured by the higher layer, Node B independently sets the initial HS-SCCH transmit power and completes the open-loop power control; the close-loop power control can employ various methods: it can either employ the method of adjusting the close-loop transmit power according to the TPC command carried on HS-SICH or employ other methods, such as the method of adjusting the close-loop transmit power by using the power value accompanying with DPCH (Dedicated Physical Channel).

Wherein, the method of the UE generating TPC parameter is: the UE takes the "HS-SCCH BLER Target" configured by the higher layer as the target value, and generates the "transmit power control TPC" parameter based on the actual value of "HS-SCCH BLER" obtained through multiple measurements;

The method of Node B generating TPC parameter is: Node B takes the "HS-SICH Signal Noise Rate" generated by itself as the target value and generates TPC by taking the measured "HS-SICH SNR" as the actual value.

The parameters related to the power control are configured by the network side for the UE and the Node B respectively, i.e.:

the network side configures the parameters related to the power control for the UE through the higher layer signaling, wherein, the higher layer signaling refers to the information element "HS-SCCH Info" in RRC (Radio Resource Control) protocol;

the parameters related to the power control is uniformly configured for the whole HS-SICH set instead of being configured for each HS-SICH individually;

according to different implementations, the parameters related to the power control configured may include: "HS-SICH Power Control Info" used for HCR TDD, "PRX$_{HS\text{-}SICH}$" and "TPC step size" used for LCR TDD, "Ack-Nack Power Offset" (acknowledgement and negative acknowledgement Power Offset) and "BLER target" (BLock ERror ratio target) used for the two types of TDDs etc.

The network side configures the parameters related to the power control for Node B through higher layer signaling, wherein, the higher layer signaling refers to the information element "Maximum HS-SCCH Power" in "Physical Shared Channel Re-configuration Request" message in NBAP (Node B Application Part) protocol.

In the following, the embodiment of the present invention will be illustrated in three parts with reference to the accompanying figures.

The First Part: the Power Control of HS-SICH Performed by the UE

FIG. 1 is a flow chart of power control of UE sending HS-SICH in accordance with the embodiment of the present invention.

Step 101: determining whether the UE receives the HS-SCCH, if not, terminating the process, otherwise, proceeding to step 102;

Step 102: determining whether the UE transmits the HS-SICH for the first time after it has searched out for the first time the HS-SCCH corresponding to its own UE identifier, if yes, proceeding to step 103 and using open-loop power control, otherwise, proceeding to step 105 and using close-loop power control;

Step 103: the UE using the open-loop power control;

Step 104: the UE reading out the related information element "Primary CCPCH Tx Power" in system broadcast message and other information elements configured by the higher layer, such as "Downlink HS-PDSCH Information", "HS-SICH Power Control Info", "HS-SICH Constant value" etc., to calculate the initial HS-SICH transmit power for the open-loop power control, wherein the calculation formulae for HCR TDD and LCR TDD are different, and for the details about the calculation methods, please refer to the related content in the Background;

Step 105: the UE receiving the succedent HS-SCCH and using the close-loop power control to send HS-SICH;

Step 106: the UE using the TPC carried on the HS-SCCH in the close-loop power control to adjust the close-loop transmit power of HS-SICH;

Step 107: the UE calculating the TPC according to the HS-SCCH BLER target configured by the higher layer and the actual HS-SCCH BLER obtained through multiple measurements, and carrying the TPC on the HS-SICH physical channel.

When the UE receives another HS-SCCH after a time interval, it equals to receiving the HS-SCCH for the first time, and the UE uses the open-loop power control and returns to step 101.

The Second Part: the Power Control of HS-SCCH Performed by Node B

Figure 2:
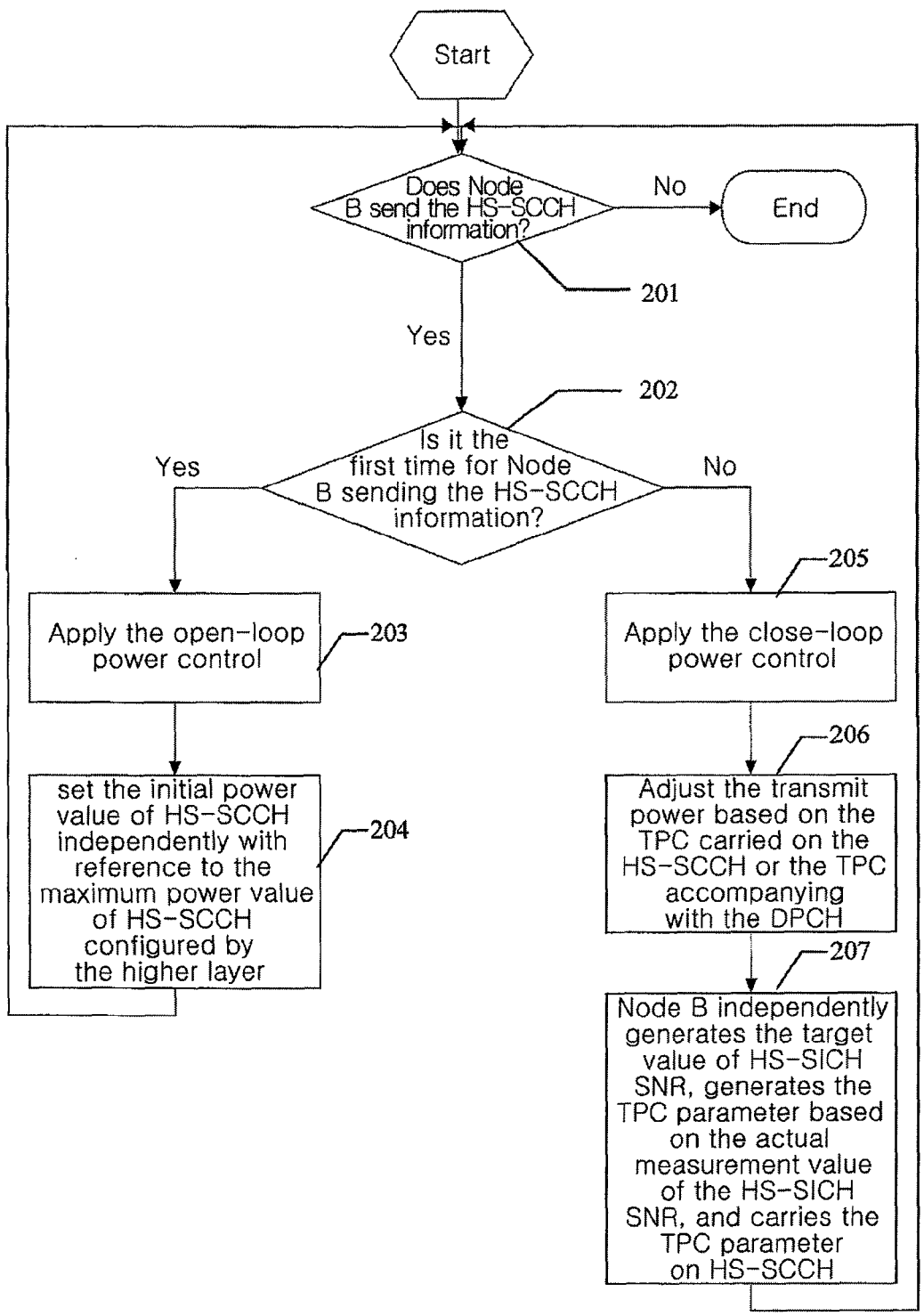
FIG. 2 is a flow chart of power control of Node B sending HS-SCCH in accordance with an embodiment of the present invention.

FIG. 2 is a flow chart of power control of Node B sending HS-SCCH in accordance with an embodiment of the present invention.

Step 201: determining whether Node B transmits HS-SCCH, if not, terminating the process, otherwise, proceeding to step 202;

Step 202: determining whether Node B transmits the HS-SCCH for the first time, if yes, proceeding to step 203 and using open-loop power control, otherwise, proceeding to step 205 and using close-loop power control;

Step 203: Node B using open-loop power control;

Step 204: Node B independently setting the initial power of HS-SCCH with reference to "HS-SCCH Maximum power" configured in "Physical Shared Channel Re-configuration Process";

Step 205: Node B using the close-loop power control after receiving the HS-SICH sent by the UE;

Step 206: Node B adjusting the close-loop transmit power of HS-SCCH according to the TPC parameter carried on HS-SICH, Node B can also adjust the close-loop transmit power of HS-SCCH by using other methods, such as TPC parameter accompanying with DPCH;

Step 207: Node B independently generating the HS-SICH SNR target according to various information, such as channel quality fed back on HS-SICH, the modulation mode of HS-PDSCH etc., and generating TPC parameter according to the actual measurement value of HS-SICH SNR to be carried on HS-SCCH.

The TPC is also generated by comparing the target value and the actual measurement value.

When Node B resends HS-SCCH after a time interval, it equals to sending HS-SCCH for the first time, and the Node B uses the open-loop power control and returns to step 201.

Wherein, it needs to be pointed out that in step 204, for the implementation of the initial power of HS-SCCH, comparing with that the higher layer configures the related parameters for the HS-SICH (the higher layer configures parameters for the UE, and the UE exclusively calculates the initial value based on the fixed formulae and the parameters), the high layer configures the parameters for HS-SCCH which are only used by Node B as reference. More specifically, the method for Node B calculating the initial power of HS-SCCH is: taking the maximum HS-SCCH power offered by the higher layer as reference (since the channel is shared, the higher layer can not provide the initial value), Node B generates the initial HS-SCCH transmit power by itself based on such synthetic factors as the using condition of HSDPA resource, the service needs of the UE, the network resource assignment information and the power control information of dedicated physical channel etc.; moreover, the initial transmit power generated by Node B can not exceed the maximum HS-SCCH power configured by the higher layer.

Specifically, step 207 can be implemented through the following steps of:

(1) Node B generating HS-SICH SNR target according to the channel information related to SNR;

(2) Node B measuring the received HS-SICH SNR to obtain the actual measurement value;

(3) Node B calculating the TPC parameter according to the target value and the actual measurement value of said HS-SICH SNR, and carrying the TPC parameter on the HS-SCCH.

Wherein, in said step (1), Node B calculates the appropriate HS-SICH SNR target by itself according to the modulation mode of HS-PDSCH (High Speed Physical Downlink Shared Channel) (the higher the modulation mode, the higher the SNR target is required), the channel quality fed back on HS-SICH (the higher the CQI value, the better the present channel quality is, and the higher the SNR can be offered by HS-SICH), the data block decoding information fed back on HS-SICH (the more accurate the encoding is, the more accurately the data is sending on HS-PDSCH; the less the times for data re-transmission is, the higher the SNR can be offered by HS-SICH), or considering these factors individually or comprehensively.

In said step (3), when the measured SNR actual value is larger than the target value, it means that the actual signal quality of HS-SICH is higher, and TPC is set as "DOWN"; when the actual value is less than the target value, it means that the actual signal quality of HS-SICH is lower, and TPC is set as "UP".

The third part: the process of the higher layer configuring the parameters related to the power control.

Through RRC protocol, the higher layer (RNC, radio network controller) sends higher layer signaling to the UE to configure the parameters related to the power control of HS-SCCH and HS-SICH.

(1) The parameters configured include the related parameters for UE calculating the initial HS-SCCH transmit power;

(2) The parameters configured also include the related parameters for UE calculating TPC, said TPC is carried on HS-SICH and is used for Node B adjusting downlink HS-SCCH;

(3) The parameters configured should be uniformly configured for the whole HS-SICH set of this UE, instead of being configured for each HS-SICH of this UE individually.

In the following table, the HS-SICH set corresponds to the HS-SCCH set, and the configuration of the parameters related to the power control has the same arrangement as that of the HS-SCCH set, that is to say, has the same arrangement as that of the HS-SICH set. Therefore, by applying this configuration method, the related parameters are uniformly configured for the whole HS-SICH set, which is as shown by the italic.

| HS-SCCH Info Table | | | | |
|---|---|---|---|---|
| Information Element | Need | Multi | Type and reference | Semantics description |
| CHOICE mode | MP | | | |
| > FDD | | | | |
| ... | ... | ... | ... | ... |
| > TDD | | | | |
| >> CHOICE TDD option | MP | | | |
| >>>3.84 Mcps (HCR TDD) | | | | |
| >>>>*Ack-Nack Power Offset* | *MP* | | *Integer (−7 . . . 8 by step of 1)* | |
| >>>*HS-SICH Power Control Info* | *MP* | | *HS-SICH Power Control Info 10.3.6.36b* | |
| >>>>*BLER target* | *MP* | | *Real (−3.15 . . . 0 by step of 0.05)* | *Signalled value is Log10 (HS-SCCH BLER quality target). The UE shall use the BLER target signalled in the first occurrence of the HS-SCCH Set Configuration.* |
| ... | ... | ... | ... | ... |
| >>>>HS-SCCH Set Configuration | MP | 1 to <maxHS-SCCHs> | | |
| ... | ... | ... | ... | configuration information element of each HS-SCCH |
| >>>>>HS-SICH configuration | | | | |
| ... | ... | ... | ... | configuration information element of each HS-SICH corresponding to each HS-SCCH |

-continued

HS-SCCH Info Table

| Information Element | Need | Multi | Type and reference | Semantics description |
|---|---|---|---|---|
| >>>1.28 Mcps (LCR TDD) | | | | |
| >>>>Ack-Nack Power Offset | MP | | Integer (−7 . . . 8 by step of 1) | |
| >>>>PRXHS-SICH (desired HS-SICH receiving power received by UE) | MP | | Integer (−120 . . . −58 by step of 1) | dBm. Desired power level for HS-SICH. |
| >>>>TPC step size | MP | | Integer (1, 2, 3) | dB. |
| >>>>BLER target | MP | | Real (−3.15 . . . 0 by step of 0.05) | Signalled value is Log10 (HS-SCCH BLER quality target). The UE shall use the BLER target signalled in the first occurrence of the HS-SCCH Set Configuration. |
| >>>>HS-SCCH Set Configuration | MP | 1 to <maxHS-SCCHs> | | |
| . . . | . . . | . . . | . . . | configuration information element of each HS-SCCH |
| >>>>>HS-SICH configuration | | | | |
| . . . | . . . | . . . | . . . | configuration information element of each HS-SICH corresponding to each HS-SCCH |

Wherein, maxHS-SCCHs is the maximum number in the HS-SCCH set assigned by Node B to one UE in a cell.

According to the embodiment of the present invention, the power control of HS-SCCH and HS-SICH can be realized through the cooperation of the above three parts.

INDUSTRIAL APPLICABILITY

By using the implement method for power control of HS-SCCH and HS-SICH of the present invention, Node B can calculate the TPC parameter used for adjusting the uplink HS-SICH close-loop power control and carry the TPC parameter on HS-SCCH to be sent to the UE, thereby realizing the power control of HS-SCCH and HS-SICH.

What we claim is:

1. A method for implementing power control of a high speed shared information channel (HS-SICH), used in High Speed Downlink Packet Access (HSDPA) technology in a TD-CDMA system to perform power control for the high speed shared information channel (HS-SICH) sent by a user equipment to a Node B, including the steps of:
configuring parameters related to the power control for the user equipment by a network side through higher layer signaling, said parameters including parameters used to calculate initial transmit power;
calculating the initial high speed shared information channel (HS-SICH) transmit power used for open-loop power control by the user equipment according to said parameters configured;
adjusting close-loop power control of the high speed shared information channel (HS-SICH) by the user equipment according to a "transmit power control" parameter calculated by the Node B and carried on a high speed shared control channel (HS-SCCH);
the method further including the steps of:
configuring the parameters related to the power control for the user equipment by the network side through the higher layer signaling, said parameters including a "high speed shared control channel (HS-SCCH) block error ratio target" parameter;
taking the "high speed shared control channel (HS-SCCH) block error ratio target" parameter configured by the higher layer as a target value by the user equipment;
measuring the received block error ratio of the high speed shared control channel (HS-SCCH) by the user equipment to obtain an actual value of "high speed shared control channel (HS-SCCH) block error ratio"; and
calculating "transmit power control" information by the user equipment according to said target value and said actual value, and carrying the "transmit power control" information on the high speed shared information channel (HS-SICH);
wherein the step of said network side configuring the parameters related to the power control for the user equipment through the higher layer signaling includes uniformly configuring a set of parameters related to the power control for the whole high speed shared information channel (HS-SICH) set of the user equipment; and
the parameters related to the power control configured by said network side for the user equipment through the higher layer signaling are configured through an information element "high speed shared control channel (HS-SCCH) Information" in a "Radio Resource Control" protocol.

* * * * *